United States Patent
Jung et al.

(10) Patent No.: US 10,551,980 B2
(45) Date of Patent: Feb. 4, 2020

(54) ELECTRONIC DEVICE AND METHOD FOR DETERMINING TOUCH COORDINATE THEREOF

(71) Applicant: Samsung Electronics Co., Ltd., Gyeonggi-do (KR)

(72) Inventors: Dae Kwang Jung, Gyeonggi-do (KR); Min Woo Lee, Gyeonggi-do (KR); Myung Su Kang, Seoul (KR); Ji Woong Oh, Seoul (KR); Hyun Ju Hong, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 59 days.

(21) Appl. No.: 15/884,682

(22) Filed: Jan. 31, 2018

(65) Prior Publication Data
US 2018/0217698 A1 Aug. 2, 2018

(30) Foreign Application Priority Data
Feb. 1, 2017 (KR) .................. 10-2017-0014589

(51) Int. Cl.
*G06F 3/044* (2006.01)
*G06K 9/00* (2006.01)

(52) U.S. Cl.
CPC .......... *G06F 3/044* (2013.01); *G06K 9/0002* (2013.01); *G06F 2203/04101* (2013.01)

(58) Field of Classification Search
CPC .......... G06F 3/044; G06F 2203/04107; G06F 2203/04101; G06K 9/0002
See application file for complete search history.

(56) References Cited

U.S. PATENT DOCUMENTS 9,892,305 B2 2/2018 Lee et al.
2006/0097991 A1 5/2006 Hotelling et al.
(Continued)

FOREIGN PATENT DOCUMENTS

JP 2008-009616 A 1/2008
KR 10-2016-0017379 A 2/2016
(Continued)

OTHER PUBLICATIONS

International Search Report dated May 24, 2018.
European Search Report dated Aug. 20, 2019.

*Primary Examiner* — Abbas I Abdulselam
(74) *Attorney, Agent, or Firm* — Cha & Reiter, LLC.

(57) ABSTRACT

An electronic device includes a cover glass, a touch sensor disposed under the cover glass and sensing proximity of or contact by an external object, a touch integrated circuit (IC) electrically connected to the touch sensor, a fingerprint sensor disposed under the cover glass adjacent to the touch sensor, including an active area for sensing a biometric pattern of the external object and an inactive area surrounding a periphery of the active area, a fingerprint IC electrically connected to the fingerprint sensor, and a processor electrically connected to the touch IC and the fingerprint IC. The processor is configured, if an input by the external object is sensed by both the touch sensor and the fingerprint sensor, to calculate coordinates of the input based on at least part of data sensed by the touch sensor and data sensed by the fingerprint sensor.

20 Claims, 13 Drawing Sheets

(56) References Cited

U.S. PATENT DOCUMENTS

| | | |
|---|---|---|
| 2009/0066670 A1 | 3/2009 | Hotelling et al. |
| 2011/0032206 A1* | 2/2011 | Kitamura ................ G06F 1/169 |
| | | 345/173 |
| 2012/0105081 A1 | 5/2012 | Shaikh et al. |
| 2012/0194459 A1* | 8/2012 | Park ...................... G06F 3/0418 |
| | | 345/173 |
| 2013/0222336 A1* | 8/2013 | Cormier, Jr. ............ G06F 3/044 |
| | | 345/174 |
| 2014/0047706 A1 | 2/2014 | Shaikh et al. |
| 2014/0146002 A1* | 5/2014 | Mo ......................... G06F 3/044 |
| | | 345/174 |
| 2015/0105124 A1* | 4/2015 | Lin ....................... H04M 1/185 |
| | | 455/557 |
| 2015/0169194 A1* | 6/2015 | Ban ..................... D06F 39/005 |
| | | 715/771 |
| 2016/0283769 A1 | 9/2016 | Lee et al. |
| 2016/0350571 A1* | 12/2016 | Han ..................... G06K 9/0002 |
| 2016/0364593 A1 | 12/2016 | Lee et al. |
| 2017/0010746 A1 | 1/2017 | Hotelling et al. |
| 2018/0335919 A1* | 11/2018 | Xu .......................... G06F 3/044 |

FOREIGN PATENT DOCUMENTS

| | | |
|---|---|---|
| KR | 10-2016-0141180 A | 12/2016 |
| WO | 2005/114369 A2 | 12/2005 |

* cited by examiner

** # ELECTRONIC DEVICE AND METHOD FOR DETERMINING TOUCH COORDINATE THEREOF

CLAIM OF PRIORITY

This application is based on and claims priority under 35 U.S.C. § 119 to Korean Patent Application No. 10-2017-0014589, filed on Feb. 1, 2017, in the Korean Intellectual Property Office, the disclosure of which is incorporated by reference herein in its entirety.

BACKGROUND

The present disclosure generally relates to a technology that determines touch coordinates using touch sensors and fingerprint sensors.

With the development of electronic technologies, various types of electronic products are being developed and distributed. In particular, electronic devices capable of a variety of functions, such as smartphones, tablet PCs, or wearable devices are currently widely distributed. These above-described electronic devices may each include a display panel serving as an output device for outputting visual information. Each electronic device may also include a touch sensor serving as an input device, which enables touch inputs by the user. Each electronic device may also include a fingerprint sensor for recognizing fingerprint information of the user of the electronic device.

The above information is presented as background information only to assist with an understanding of the present disclosure. No determination has been made, and no assertion is made, as to whether any of the above might be applicable as prior art with regard to the present disclosure.

SUMMARY

An electronic device may include a touch sensor and a fingerprint sensor that are disposed on a display panel. If the fingerprint sensor is disposed on the display panel, the fingerprint sensor may interfere with the recognition of touch input by the touch sensor. For example, wirings in the periphery of the fingerprint sensor and/or a shield member included in the fingerprint sensor may interfere with the recognition of the touch input.

Embodiments disclosed in the present disclosure provide electronic devices and methods that determine the coordinates of a touch input on the periphery of a fingerprint sensor disposed on a display panel.

In accordance with an aspect of the present disclosure, an electronic device includes a display, a touch sensor disposed in at least a partial area of the display, a fingerprint sensor disposed in at least part of the partial area of the display and including a sensing area for sensing biometric information and a wiring area in which a plurality of wirings connected to the sensing area are disposed, and a processor. The processor is configured to using the touch sensor and the fingerprint sensor, sense an input at least partially overlapping a partial area of the wiring area, in response to sensing the input, to obtain first location information about the input using the touch sensor and to obtain second location information about the input using the fingerprint sensor, and to determine location information of the input corresponding to the partial area of the wiring area, based at least on the first location information and the second location information.

In accordance with an aspect of the present disclosure, an electronic device includes a cover glass, a touch sensor disposed under the cover glass and sensing proximity of or contact by an external object, a touch integrated circuit (IC) electrically connected to the touch sensor, a fingerprint sensor disposed under the cover glass adjacent to the touch sensor, including an active area for sensing a biometric pattern of the external object and an inactive area surrounding a periphery of the active area, a fingerprint IC electrically connected to the fingerprint sensor, and a processor electrically connected to the touch IC and the fingerprint IC. The processor is configured, if an input by the external object is sensed by both the touch sensor and the fingerprint sensor, to calculate coordinates of the input based on at least part of data sensed by the touch sensor and data sensed by the fingerprint sensor.

In accordance with an aspect of the present disclosure, a touch coordinate sensing method of an electronic device includes activating a touch sensor and a fingerprint sensor included in the electronic device, sensing an input by an external object, by using the touch sensor and the fingerprint sensor, and if the input by the external object is sensed by both the touch sensor and the fingerprint sensor, calculating coordinates of the input based on at least part of data sensed by the touch sensor and data sensed by the fingerprint sensor.

According to various embodiments of the present disclosure, if a touch input is sensed by both a touch sensor and a fingerprint sensor, the coordinates of the touch input may be calculated based on data sensed by the touch sensor and/or the fingerprint sensor, even when the touch input falls on an inactive area of the fingerprint sensor. This way, the coordinates of the touch input may be determined on the entire area of the display.

In addition, other advantages and features directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
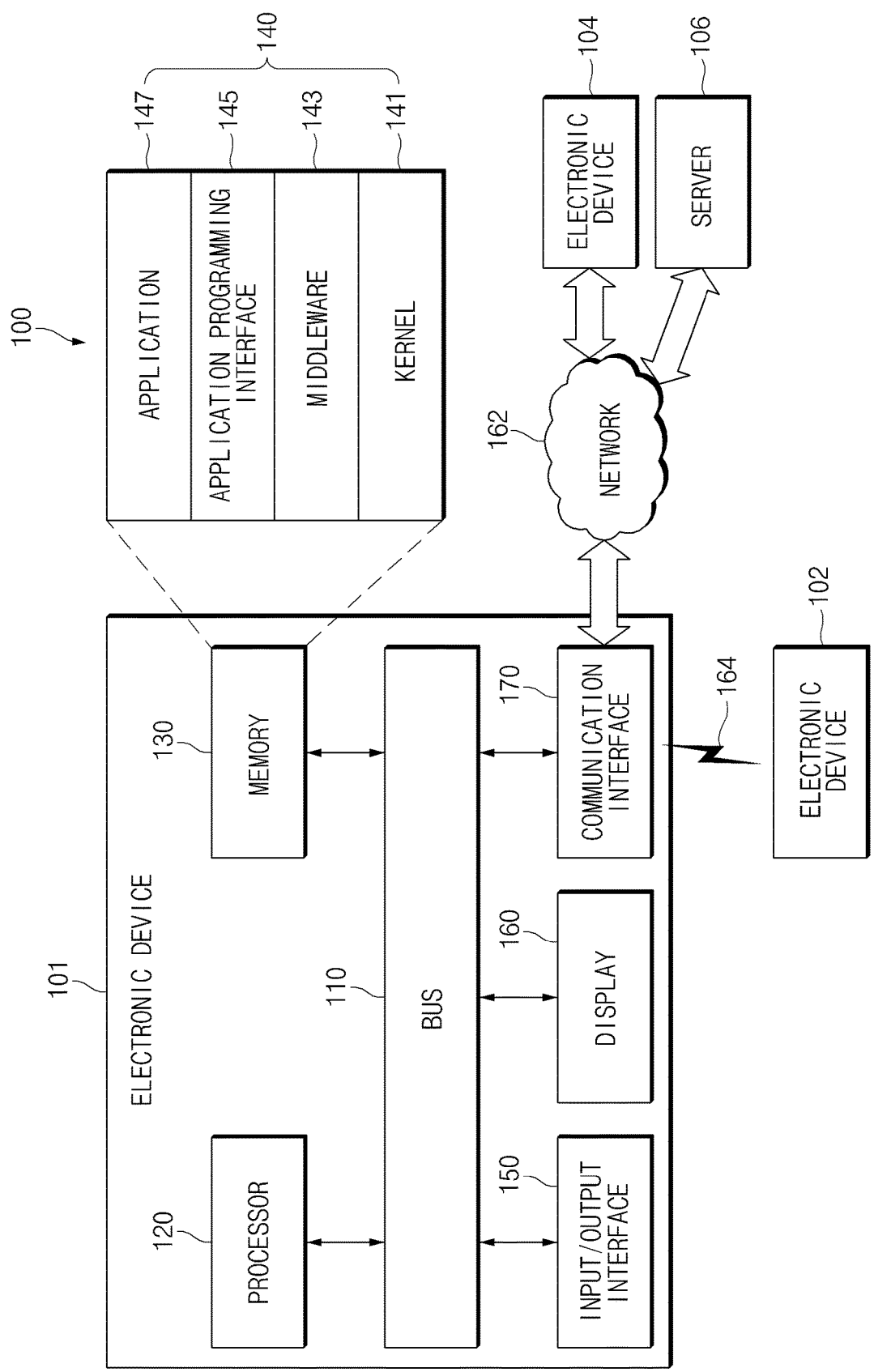
FIG. 1 illustrates an electronic device in a network environment, according to an embodiment.

Hereinafter, various embodiments of the present disclosure may be described with reference to accompanying drawings. Embodiments and terms used herein are not intended to limit the technologies described in the present disclosure to specific embodiments, and it should be understood that the embodiments and the terms include modification, equivalent, and/or alternative on the corresponding embodiments described herein. The terms of a singular form may include plural forms unless otherwise specified. In the disclosure disclosed herein, the expressions "A or B," "at least one of A or/and B," and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "configured to" used herein may be interchangeably used as, for example, the expression "suitable for," "having the capacity to," "designed to," "adapted to," "made to," or "capable of" The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

According to various embodiments of the present disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to an embodiment, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™) electronic dictionaries, electronic keys, camcorders, electronic picture frames, or the like.

According to another embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs), points of sales (POSs), or internet of things (e.g., light bulbs, various sensors, sprinkler devices, fire alarms, thermostats, street lamps, toasters, exercise equipment, hot water tanks, heaters, boilers, and the like). According to another embodiment, the electronic devices may include at least one of parts of furniture, buildings/structures, or vehicles, electronic boards, electronic signature receiving devices, projectors, or various measuring instruments (e.g., water meters, electricity meters, gas meters, or wave meters, and the like). According to various embodiments, an electronic device may be a flexible electronic device or may be a combination of two or more of the above-described devices. An electronic device according to an embodiment of the present disclosure may not be limited to the above-described electronic devices. The term "user" used herein may refer to a person who uses an electronic device or may refer to a device (e.g., an artificial intelligence electronic device) that uses an electronic device.

Referring to FIG. 1, there is illustrated an electronic device 101 in a network environment 100 according to an embodiment. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message or data) among the above-described elements. The processor 120 may include one or more of a central processing unit (CPU), an application processor (AP), or a communication processor (CP). The processor 120 may perform, for example, data processing or an operation associated with control or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or an "application") 147. At least a part of the kernel 141, the middleware 143, or the API 145 may be called an "operating system (OS)". The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147 and may process the task requests. The API 145 may be an interface through which the application program 147 controls a function provided by the kernel 141 or the middleware 143, and may include, for example, at least one interface or function (e.g., an instruction) for a file control, a window control, image processing, a character control, or the like. For example, the I/O interface 150 may transmit an instruction or data, input from a user or another external device, to other element(s) of the electronic device 101, or may output an instruction or data, input from the other element(s) of the electronic device 101, to the user or the external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of content (e.g., a text, an image, a video, an icon, a symbol, or the like) to a user. The display 160 may include a touch screen and may receive, for example, a touch, gesture, proximity, or hovering input using an electronic pen or a portion of a user's body. The communication interface 170 may establish communication between the electronic device 101 and an external electronic device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include a cellular communication that uses at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the local area network may include at least one of wireless fidelity (Wi-Fi), Bluetooth, Bluetooth low energy (BLE), Zigbee, near field communication (NFC), magnetic secure transmission (MST), or radio frequency (RF), or body area network (BAN). According to an embodiment, a wireless communication may include the GNSS. The GNSS may be, for example, a global positioning system (GPS), a global navigation satellite system (Glonass), a Beidou Navigation Satellite System (hereinafter referred to as "Beidou"), or an European global satellite-based navigation system (Galileo). In this specification, "GPS" and "GNSS" may be interchangeably used. The wired communication may include at least one of, for example, a universal serial bus (USB), a high definition multimedia interface (HDMI), a recommended standard-232 (RS-232), a power line communication, a plain old telephone service (POTS), or the like. The network 162 may include at least one of a telecommunication network, for example, a computer network (e.g., LAN or WAN), an Internet, or a telephone network.

Each of the first and second external electronic devices 102 and 104 may be a device of which the type is different from or the same as that of the electronic device 101. According to various embodiments, all or a part of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a part of a function associated with the electronic device 701 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service by processing the received result as it is, or additionally. To this end, for example, cloud computing, distributed computing, or client-server computing may be used.

Figure 2:
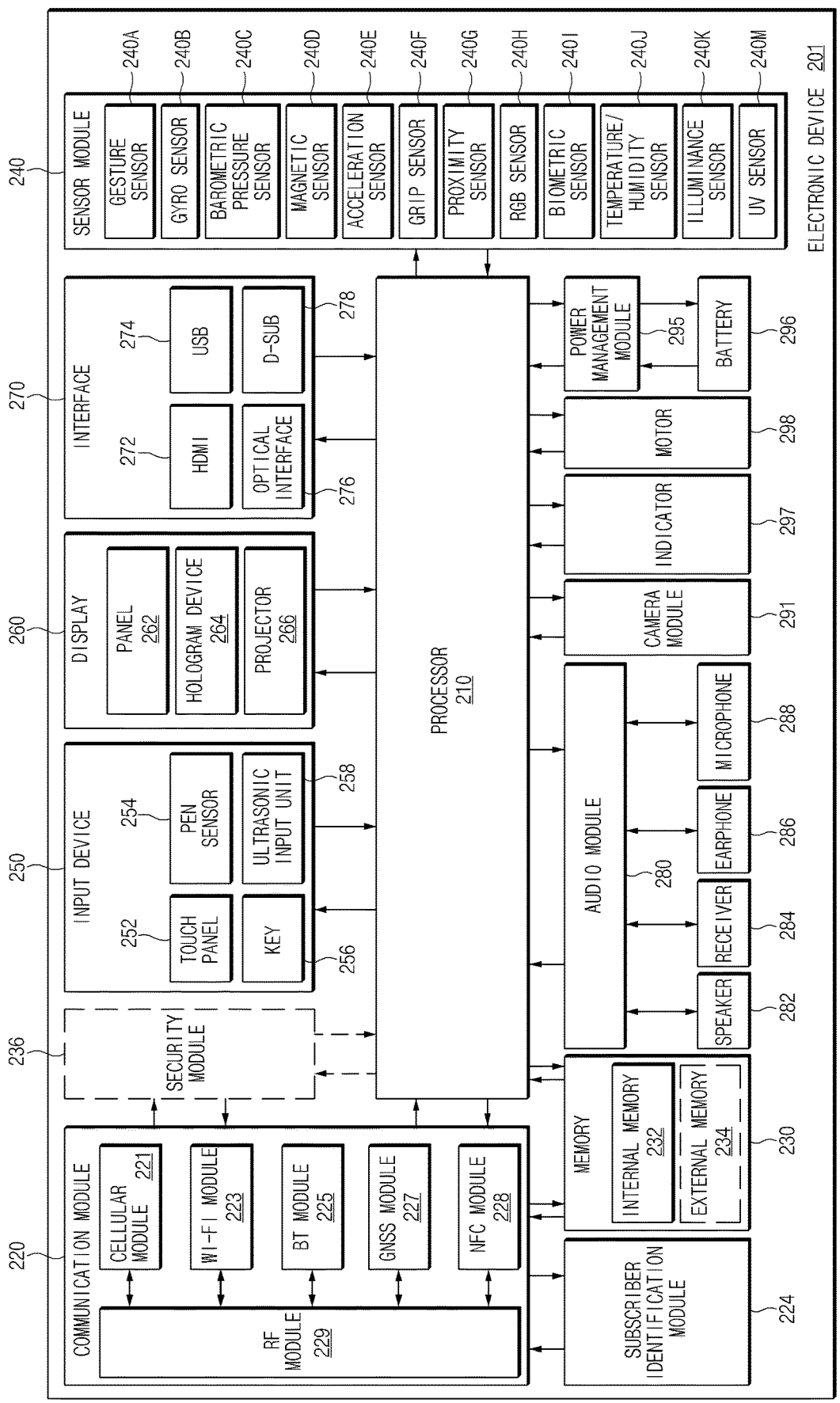
FIG. 2 illustrates a block diagram of an electronic device, according to an embodiment.

FIG. 2 is a block diagram illustrating an electronic device 201 according to an embodiment. An electronic device 201 may include, for example, all or a part of an electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may drive an operating system (OS) or an application program to control a plurality of hardware or software elements connected to the processor 210 and may process and compute a variety of data. The processor 210 may be implemented with a System on Chip (SoC), for example. According to an embodiment, the processor 210 may further include a graphic processing unit (GPU) and/or an image signal processor. The processor 210 may include at least a part (e.g., a cellular module 221) of elements illustrated in FIG. 2. The processor 210 may load and process an instruction or data, which is received from at least one of other elements (e.g., a nonvolatile memory) and may store result data in a nonvolatile memory. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 220 may be configured the same as or similar to a communication interface 170. For example, the communication module 220 may include a cellular module 221, a wireless-fidelity (Wi-Fi) module 223, a Bluetooth (BT) module 225, a global navigation satellite system (GNSS) module 227, a near field communication (NFC) module 228, and a radio frequency (RF) module 229. The cellular module 221 may provide voice communication, video communication, a character service, an Internet service, or the like through a communication network. According to an embodiment, the cellular module 221 may perform discrimination and authentication of the electronic device 201 within a communication network using a subscriber identification module 224 (e.g., a SIM card), for example. According to an embodiment, the cellular module 221 may perform at least a portion of functions that the processor 210 provides. According to an embodiment, the cellular module 221 may include a communication processor (CP). According to an embodiment, at least a part (e.g., two or more elements) of the cellular module 221, the Wi-Fi module 223, the BT module 225, the GPS module 227, or the NFC module 228 may be included within one Integrated Circuit (IC) or an IC package. The RF module 229 may transmit and receive, for example, a communication signal (e.g., an RF signal). The RF module 229 may include a transceiver, a power amplifier module (PAM), a frequency filter, a low noise amplifier (LNA), an antenna, or the like. According to various embodiments, at least one of the cellular module 221, the Wi-Fi module 223, the BT module 225, the GNSS module 227, or the NFC module 228 may transmit and receive an RF signal through a separate RF module. The subscriber identification module 224 may include, for example, a card or an embedded SIM which includes a subscriber identification module and may include unique identification information (e.g., integrated circuit card identifier (ICCID)) or subscriber information (e.g., integrated mobile subscriber identity (IMSI)).

For example, the memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be functionally or physically connected with the electronic device 201 through various interfaces.

The sensor module 240 may measure, for example, a physical quantity or may detect an operating state of the electronic device 201. The sensor module 240 may convert the measured or detected information to an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an e-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit that controls at least one or more sensors included therein. According to an embodiment, the electronic device 201 may further include a processor which is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user. The (digital) pen sensor 254 may be, for example, a part of a touch panel or may include an additional sheet for recognition. The key 256 may include, for example, a physical button, an optical key, a keypad, and the like. The ultrasonic input device 258 may detect (or sense) an ultrasonic signal, which is generated from an input device, through a microphone (e.g., a microphone 288) and may verify data corresponding to the detected ultrasonic signal.

The display 260 (e.g., the display 160) may include a panel 262, a hologram device 264, a projector 266, and/or a control circuit that controls the panel 262, the hologram device 264, and the projector 266. The panel 262 may be implemented to be flexible, transparent or wearable, for example. The panel 262 and the touch panel 252 may be integrated into one or more modules. According to an embodiment, the panel 262 may include a pressure sensor (or a "force sensor") that is capable of measuring the intensity of pressure on the touch of the user. The pressure sensor may be integrated with the touch panel 252 or may be implemented with one or more sensors that are independent of the touch panel 252. The hologram device 264 may display a stereoscopic image in a space using a light interference phenomenon. The projector 266 may project light onto a screen so as to display an image. The screen may be arranged inside or outside the electronic device 201. The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a secure Digital (SD) card/multi-media card (MMC) interface, or an infrared data association (IrDA) standard interface.

The audio module 280 may convert a sound and an electric signal in dual directions. At least a part of the audio module 280 may be included, for example, in the I/O interface 150 illustrated in FIG. 1. The audio module 280 may process, for example, sound information that is input or output through a speaker 282, a receiver 284, an earphone 286, or a microphone 288. The camera module 291 for shooting a still image or a video may include, for example, at least one image sensor (e.g., a front sensor or a rear sensor), a lens, an image signal processor (ISP), or a flash (e.g., an LED or a xenon lamp) The power management module 295 may manage, for example, power of the electronic device 201. According to an embodiment, the power management module 295 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. For example, the electronic device 201 may include a mobile TV supporting device that processes media data according to the standards of digital multimedia broadcasting (DMB), digital video broadcasting (DVB), MediaFlo™, or the like. Each of the above-mentioned elements of the electronic device according to various embodiments of the present disclosure may be configured with one or more components, and the names of the elements may be changed according to the type of the electronic device. According to various embodiments, the electronic device (e.g., the electronic device 201) may exclude some elements or may further include other additional elements. Alternatively, some of the elements of the electronic device may be combined with each other so as to form one entity, so that the functions of the elements may be performed in the same manner as before the combination.

Figure 3:
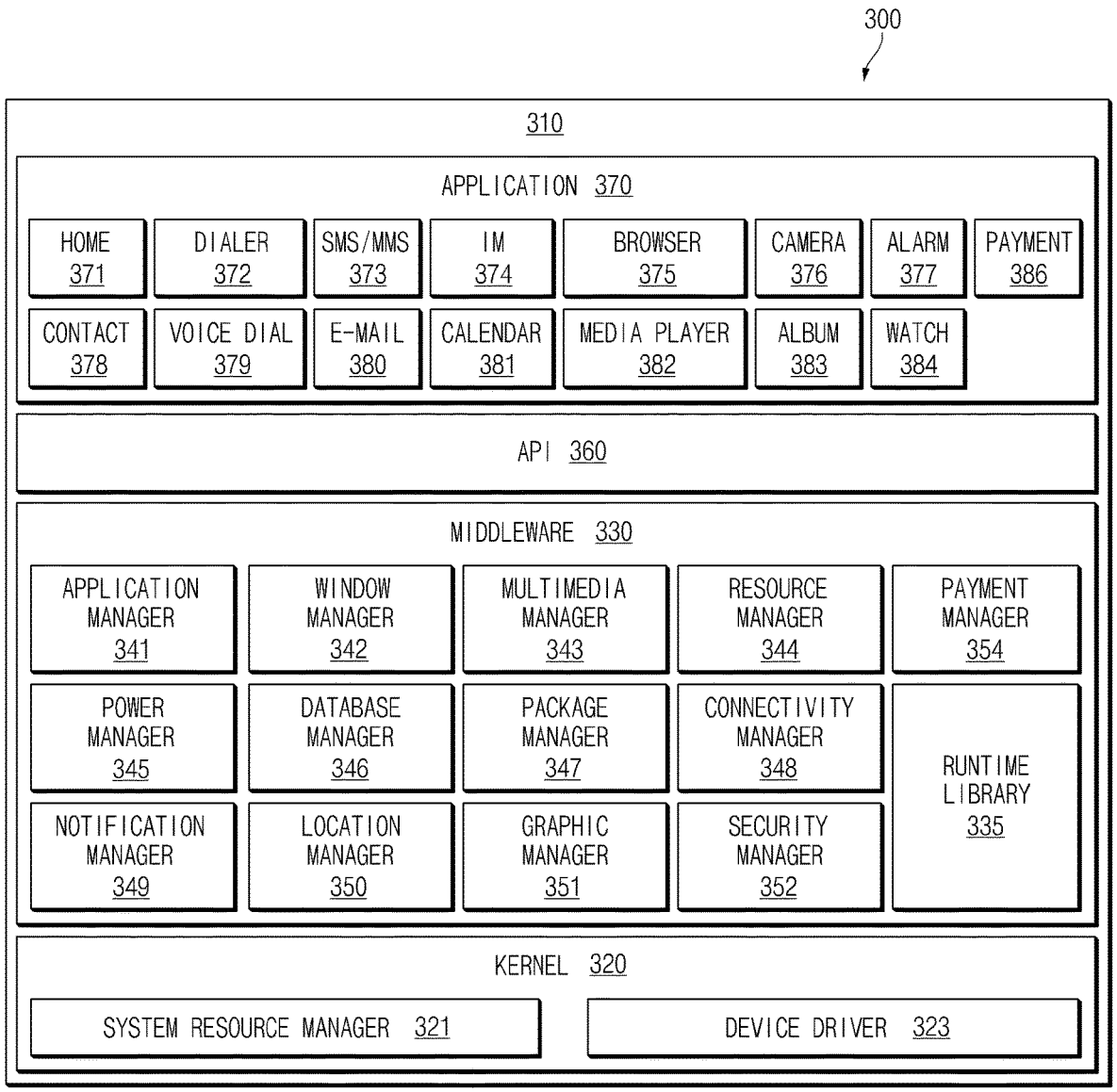
FIG. 3 illustrates a block diagram of a program module, according to an embodiments.

FIG. 3 is a block diagram of a program module, according to an embodiment. According to an embodiment, a program module 310 (e.g., the program 140) may include an operating system (OS) to control resources associated with an electronic device (e.g., the electronic device 101), and/or diverse applications (e.g., the application program 147) driven on the OS. The OS may include, for example, Android™, iOS™, Windows™, Symbian™, Tizen™, or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded on an electronic device or may be downloadable from an external electronic device (e.g., the electronic device 102 or 104, the server 106, or the like).

The kernel 320 may include, for example, a system resource manager 321 and/or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a common memory driver, an USB driver, a keypad driver, a Wi-Fi driver, an audio driver, or an inter-process communication (IPC) driver. The middleware 330 may provide, for example, a function which the application 370 needs in common or may provide diverse functions to the application 370 through the API 360 to allow the application 370 to use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module, which is used by a compiler, to add a new function through a programming language while the application 370 is being executed. The runtime library 335 may perform input/output management, memory management, or processing of arithmetic functions. The application manager 341 may manage, for example, the life cycle of the application 370. The window manager 342 may manage a GUI resource which is used in a screen. The multimedia manager 343 may identify a format necessary to play media files, and may perform encoding or decoding of media files by using a codec suitable for the format. The resource manager 344 may manage source code of the application 370 or a space of a memory. For example, the power manager 345 may manage the capacity of a battery or power and may provide power information that is needed to operate an electronic device. According to an embodiment, the power manager 345 may operate in conjunction with a basic input/output system (BIOS). For example, the database manager 346 may generate, search for, or modify a database which is to be used in the application 370. The package manager 347 may install or update an application which is distributed in the form of a package file.

The connectivity manager 348 may manage, for example, wireless connection. The notification manager 349 may provide a user with an event such as an arrival message, an appointment, or a proximity notification. The location manager 350 may manage, for example, location information of an electronic device. The graphic manager 351 may manage, for example, a graphic effect to be provided to a user or a user interface relevant thereto. The security manager 352 may provide, for example, system security or user authentication. According to an embodiment, the middleware 330 may include a telephony manager, which manages a voice or video call function of the electronic device, or a middleware module that combines functions of the above-described elements. According to an embodiment, the middleware 330 may provide a module specialized to each OS kind. The middleware 330 may remove a part of the preexisting elements, dynamically, or may add new elements thereto. The API 360 may be, for example, a set of programming functions and may be provided with another configuration which is variable depending on an OS. For example, in the case where an OS is the android or iOS™, it may be permissible to provide one API set per platform. In the case where an OS is Tizen™, it may be permissible to provide two or more API sets per platform.

The application 370 may include, for example, a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a watch 384, health care (e.g., measuring an exercise quantity, blood sugar, or the like), or an application for offering environment information (e.g., atmospheric pressure, humidity, or temperature). According to an embodiment, the application 370 may include an information exchanging application that supports information exchange between an electronic device and an external electronic device. The information exchanging application may include, for example, a notification relay application for transmitting specific information to the external electronic device, or a device management application for managing the external electronic device. For example, the notification relay application may send notification information, which is generated from other applications of an electronic device, to an external electronic device or may receive the notification information from the external electronic device and may provide a user with the notification information. The device management application may install, delete, or update, for example, a function (e.g., turn-on/turn-off of an external electronic device itself (or a part of components) or adjustment of brightness (or resolution) of a display) of the external electronic device, which communicates with an electronic device, or an application running in the external electronic device. According to an embodiment, the application 370 may include an application (e.g., a health care application of a mobile medical device) that is assigned in accordance with an attribute of the external electronic device. According to an embodiment, the application 370 may include an application received from an external electronic device. At least a part of the program module 310 may be implemented (e.g., performed) by software, firmware, hardware (e.g., the processor 210), or a combination of two or more thereof, and may include modules, programs, routines, sets of instructions, or processes for performing one or more functions.

Figure 4:
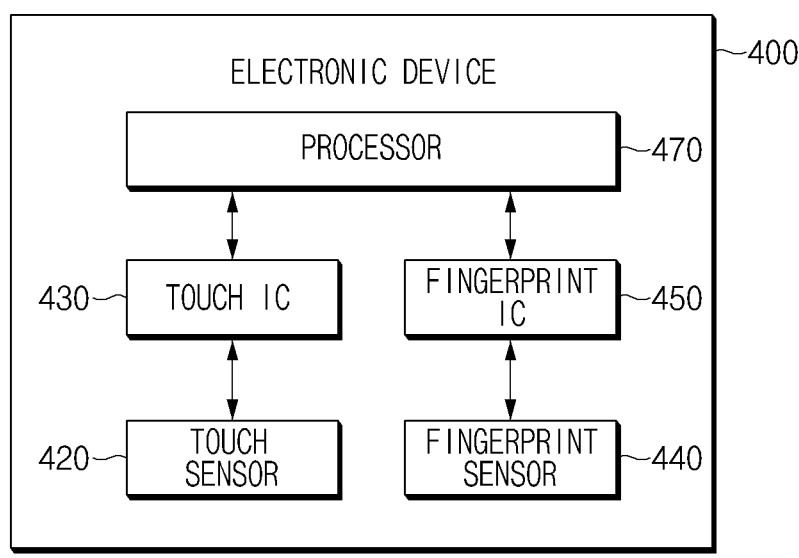
FIG. 4 is a block diagram illustrating a configuration of an electronic device, according to an embodiment.

FIG. 4 is a block diagram illustrating a configuration of an electronic device, according to an embodiment.

Referring to FIG. 4, an electronic device 400 (e.g., the electronic device 101 or the electronic device 201) according to an embodiment may include a touch sensor 420 (e.g., the touch panel 252), a touch IC 430, a fingerprint sensor 440 (e.g., the biometric sensor 240I), a fingerprint IC 450, and a processor 470 (e.g., the processor 120 or the processor 210). For example, the electronic device 400 may be one of various devices such as a smartphone, a tablet PC, a wearable device, and the like. The electronic device 400 may be referred to as a "mobile device," a "mobile terminal," "user equipment (UE)," or the like.

The touch sensor 420 may sense the proximity or actual contact of an external object. For example, the touch sensor 420 may sense the proximity or contact of an external object (e.g. the user's finger) to the cover glass of the display panel. The touch sensor 420 may be one of various types of sensors such as a resistive sensor, a capacitive sensor, an optical sensor, and the like.

The touch IC 430 may be electrically connected to the touch sensor 420. The touch IC 430 may control the touch sensor 420. The touch IC 430 may determine the coordinates of the touch input based on the signal received from the touch sensor 420. The touch IC 430 may transmit the coordinates of the touch input to the processor 470.

The fingerprint sensor 440 may be disposed to be adjacent to the touch sensor 420. In one example, the fingerprint sensor 440 may be a capacitive sensor. The fingerprint sensor 440 may recognize fingerprints by measuring a voltage of a part adjacent to the ridge of the fingerprint and a voltage of a part adjacent to the valley of the fingerprint. The fingerprint sensor 440 may include an active area for sensing the fingerprint and an inactive area surrounding the periphery of the active area. For example, the active area may include electrodes for sensing the fingerprint. The inactive area may include other electrical components, such as wires that are electrically connected to the electrodes.

In detail, the exemplary arrangement of the fingerprint sensor 440 and the touch sensor 420 will be described with reference to FIGS. 5 and 6.

According to an embodiment, the fingerprint IC 450 may be electrically connected to the fingerprint sensor 440. The fingerprint IC 450 may determine the fingerprint based on the signal received from the fingerprint sensor 440. The fingerprint IC 450 may also determine the coordinates of a touch input based on the signal received from the fingerprint sensor 440. For example, the touch input may be generated when the user's finger touches the fingerprint sensor 440. The fingerprint IC 450 may transmit the coordinates of the touch input to the processor 470.

According to an embodiment, the fingerprint IC 450 may be electrically connected to the touch IC 430. According to an embodiment, the touch IC 430 and/or the fingerprint IC 450 may transmit, to the processor 470, at least part of the coordinates at which a touch input is sensed by the touch sensor 420, and at least part of the coordinates at which a touch input is sensed by the fingerprint sensor 440. For example, the touch IC 430 and the fingerprint IC 450 may collect signals from the touch sensor 420 and the fingerprint sensor 440 and generate sets of collected coordinates. The touch IC 430 and the fingerprint IC 450 may then extract coordinates from the sets of collected coordinates and may transmit the extracted coordinates to the processor 470. As described below, the processor 470 may further process the extracted coordinates to further determine the coordinates of the input in the inactive area of the fingerprint sensor 440.

The processor 470 may be electrically connected to the touch IC 430 and the fingerprint IC 450. The processor 470 may control the touch IC 430 and the fingerprint IC 450.

According to an embodiment, the processor 470, using the touch sensor 420 and the fingerprint sensor 440, may sense the input by the external object. For example, if a voltage sensed by the touch sensor 420 and the fingerprint sensor 440 is changed by the proximity or contact of the external object, the processor 470 may obtain the coordinates of the input. Alternatively, the processor 470 may receive the coordinates of the input from other components such as the touch IC 430 and/or the fingerprint IC 450.

According to an embodiment, if the input by the external object (e.g. touch input by the user's finger) is sensed by both the touch sensor 420 and the fingerprint sensor 440, the processor 470 may calculate the coordinates of the input based at least partly on data sensed by the touch sensor 420 and data sensed by the fingerprint sensor 440. For example, if the input by the external object is sensed by the touch sensor 420 and the fingerprint sensor 440, the processor 470 may receive the coordinates from the touch IC 430 and/or the fingerprint IC 450. The processor 470 may calculate the coordinates of the input based on the coordinates received from the touch IC 430 and/or the fingerprint IC 450. In another example, using the touch sensor 420 and the fingerprint sensor 440, the processor 470 may determine that the input is placed over an inactive area of the fingerprint sensor 440. The processor 470 may then obtain first location information of the input by using the touch sensor 420 and may obtain second location information of the input by using the fingerprint sensor 440. The processor 470 may then determine the coordinates of the input using the first location information and the second location information. The processor 470 may treat the touch input corresponding to the location information as received. In detail, an exemplary method of calculating coordinates will be described with reference to FIGS. 8 to 12.

Figure 5:
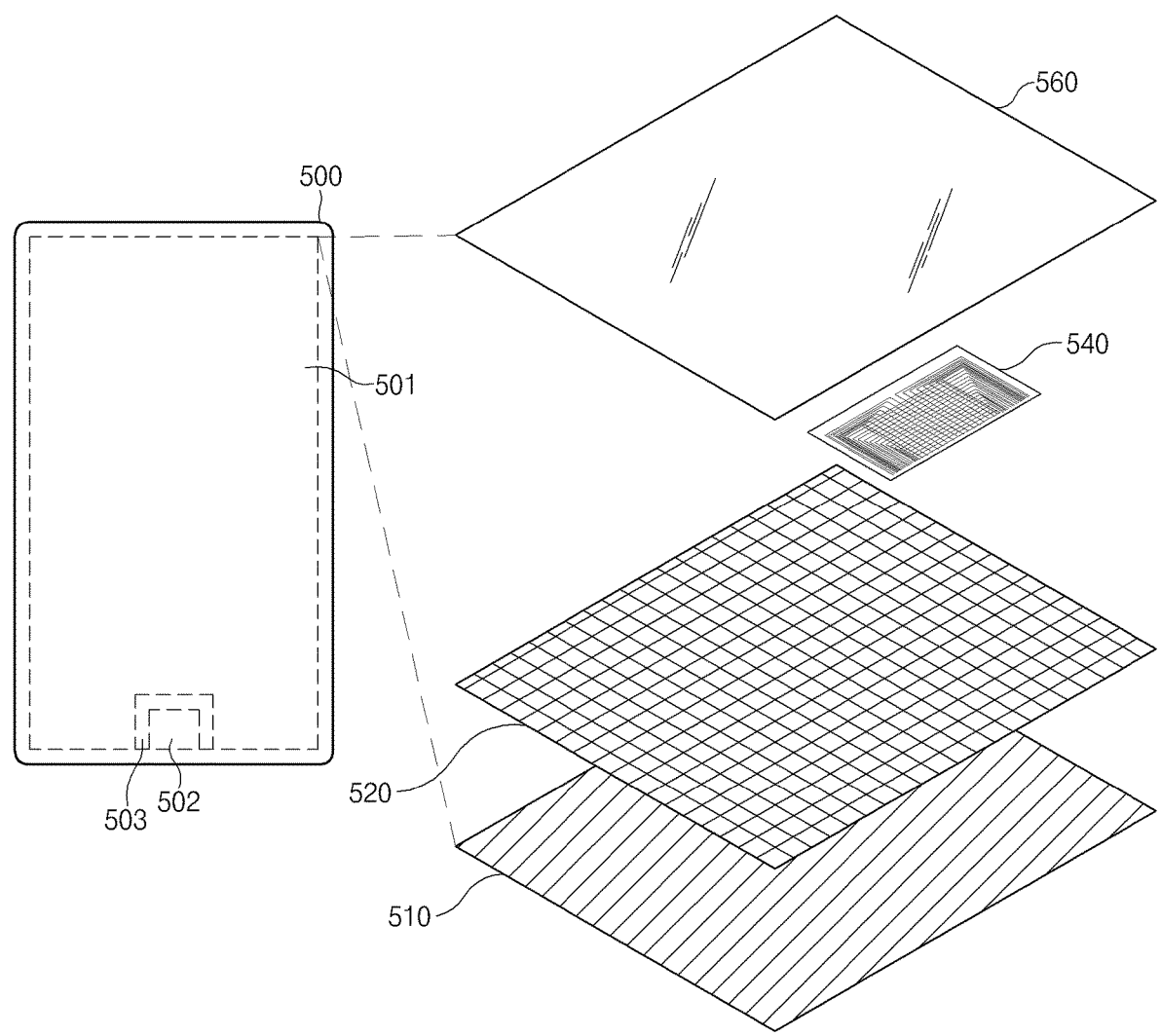
FIG. 5 is front and exploded perspective views of an electronic device, according to an embodiment.

FIG. 5 is front and exploded perspective views of an electronic device, according to an embodiment.

Referring to FIG. 5, an electronic device 500 according to an embodiment may include a display panel 510, a touch sensor 520, a fingerprint sensor 540, and a cover glass 560. The touch sensor 520 and the fingerprint sensor 540 in FIG. 5 may have the same configurations as the touch sensor 420 and the fingerprint sensor 440 in FIG. 4.

The display panel 510 may be disposed under a first area 501, a second area 502, and a third area 503 of the electronic device 500. The display panel 510 may output an image.

The touch sensor 520 may be disposed on the display panel 510, such as in at least a partial area of the display panel 510. For proximity or touch detection, the touch sensor 520 may include electrodes that intersect with each other. Accordingly, the touch sensor 520 may sense an external object (e.g. human body) that contacts the cover glass 560 or is adjacent to the cover glass 560.

The fingerprint sensor 540 may be disposed on the touch sensor 520. In a top view as shown on the left of FIG. 5, the fingerprint sensor 540 may overlap the touch sensor 520. The fingerprint sensor 540 may be disposed in at least a partial area of the display panel 510. The fingerprint sensor 540 may include an active area (or sensing area) for sensing the fingerprint pattern (or biometric information) of the external object and an inactive area (or wiring area) surrounding the periphery of the active area. The active area of the fingerprint sensor 540 may include electrodes that intersect with each other. For purposes of fingerprint detection, the electrodes of the fingerprint sensor 540 may be arranged more densely than the electrodes of the touch sensor 520. The fingerprint sensor 540 may include electrodes in the active area and wirings disposed in the inactive area. Although not illustrated in FIG. 5, the fingerprint sensor 540 may include a shield member disposed in the inactive area for the purpose of shielding electromagnetic waves emitted from the electrodes and wirings of the fingerprint sensor 540. According to an embodiment, using the shielding member, it is possible to prevent electromagnetic interference between the touch sensor 520 and the fingerprint sensor 540. The shield member may be disposed above and/or below the wirings. The fingerprint sensor 540 may interfere with the operations of the touch sensor 520 where the touch sensor 520 overlaps the fingerprint sensor 540.

For example, the touch sensor 520 may sense the input by the external object in the first area 501. The fingerprint sensor 540 may sense the input by the external object in the second area 502. The second area 502 may be an area corresponding to the active area of the fingerprint sensor 540. The third area 503 may be an area corresponding to the inactive area of the fingerprint sensor 540. The touch sensor 520 may not sense the input by the external object in the second area 502 and the third area 503 due to the fingerprint sensor 540 being present. The fingerprint sensor 540 may not sense the input by the external object in the third area 503 because it corresponds to the inactive area. If the input by the external object to the third area 503 occurs, the electronic device 500 (i.e. the processor in the electronic device 500) may calculate the coordinates corresponding to the input, based on data sensed by the touch sensor 520 and/or data sensed by the fingerprint sensor 540.

The cover glass 560 may be disposed on the fingerprint sensor 540. The cover glass 560 may protect the fingerprint sensor 540, the touch sensor 520, and the display panel 510.

Figure 6:
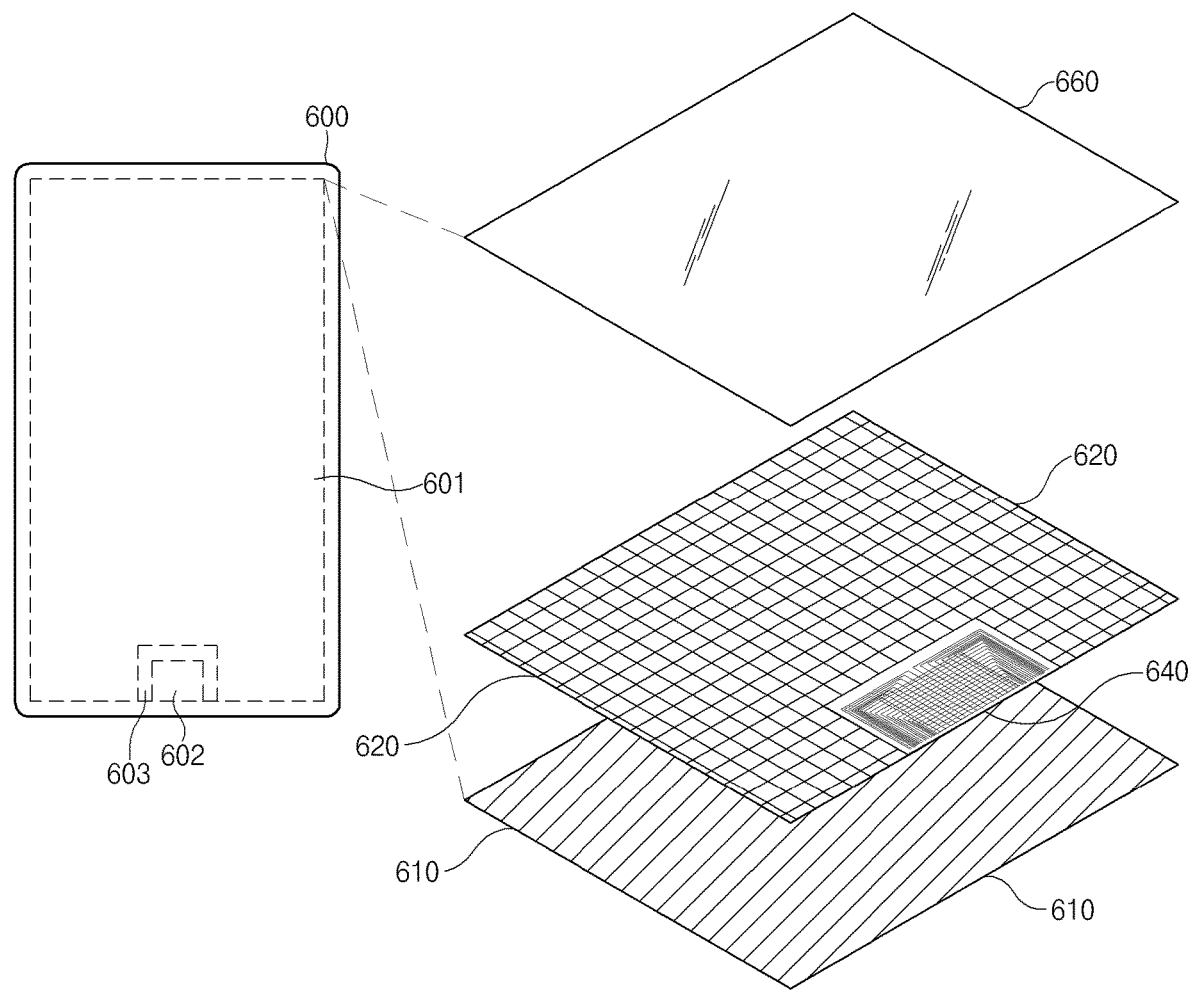
FIG. 6 is front and exploded perspective views of an electronic device, according to an embodiment.

FIG. 6 is front and exploded perspective views of an electronic device, according to an embodiment.

Referring to FIG. 6, an electronic device 600 according to an embodiment may include a display panel 610, a touch sensor 620, a fingerprint sensor 640, and a cover glass 660. The touch sensor 620 and the fingerprint sensor 640 in FIG. 6 may have the same configurations as the touch sensor 420 and the fingerprint sensor 440 in FIG. 4. The display panel 610 and the cover glass 660 in FIG. 6 may have the same configurations as the display panel 510 and the cover glass 560 in FIG. 5.

The touch sensor 620 and the fingerprint sensor 640 may be disposed under the cover glass 660. According to an embodiment, the fingerprint sensor 640 and the touch sensor 620 may be disposed on the same plane. For example, the fingerprint sensor 640 may be disposed such that the inactive area of the fingerprint sensor 640 is laterally adjacent to the touch sensor 620. A space for containing the fingerprint sensor 640 may be formed in the touch sensor 620.

For example, the touch sensor 620 may sense the input by the external object in a first area 601. The fingerprint sensor 640 may sense the input by the external object in a second area 602. The second area 602 may be an area corresponding to the active area of the fingerprint sensor 640. A third area 603 may be an area corresponding to the inactive area of the fingerprint sensor 640. The touch sensor 620 or the fingerprint sensor 640 may not sense the input by the external object in the third area 603 because it corresponds to the inactive area. If the input by the external object to the third area 603 occurs, the electronic device 600 (i.e. the processor in the electronic device 600) may calculate the coordinates corresponding to the input, based on data sensed by the touch sensor 620 and/or data sensed by the fingerprint sensor 640.

Figure 7:
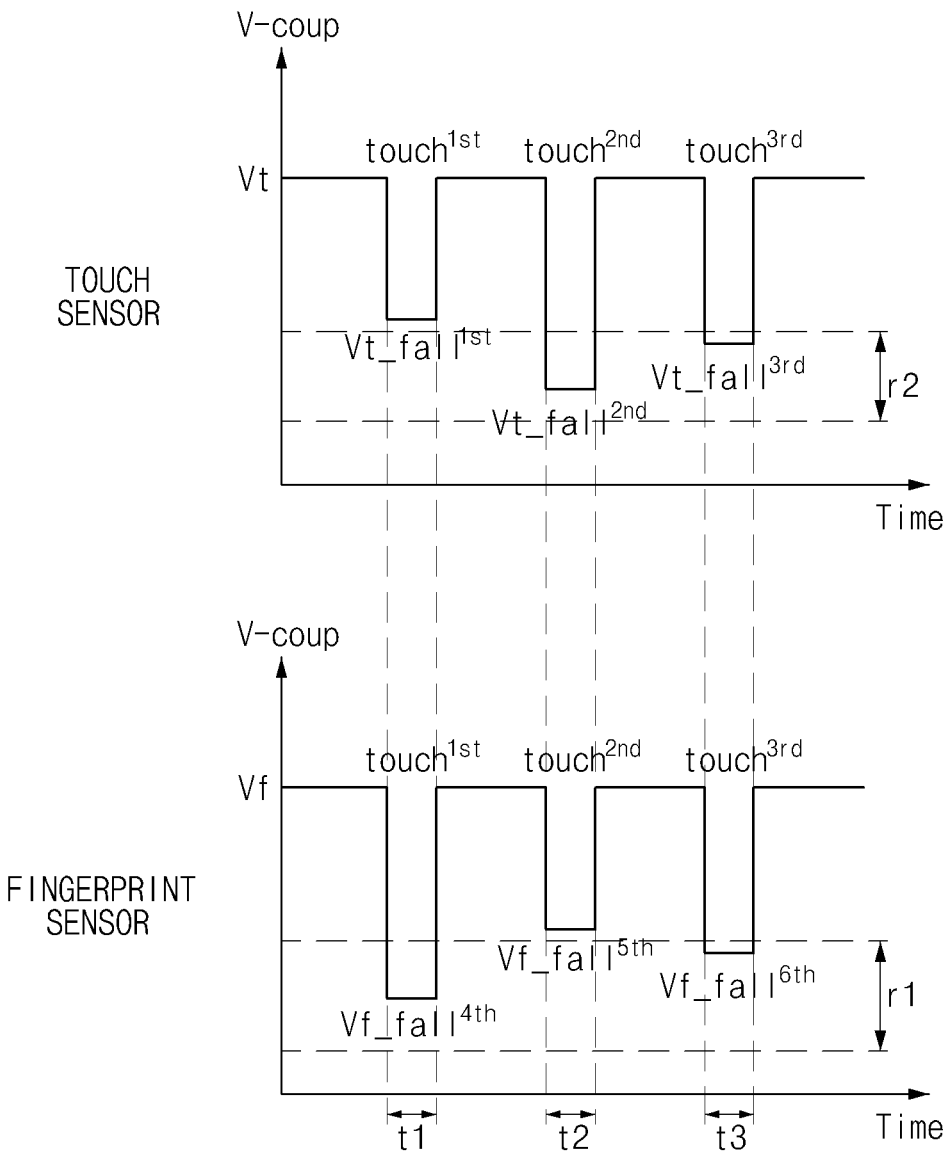
FIG. 7 are graphs illustrating voltages sensed by a touch sensor and a fingerprint sensor included in an electronic device over time, according to an embodiment.

FIG. 7 are graphs illustrating voltages sensed by a touch sensor and a fingerprint sensor included in an electronic device over time, according to an embodiment.

Referring to FIG. 7, an electronic device according to an embodiment may sense change in voltage from a touch sensor and a fingerprint sensor. For example, the touch sensor may sense a first falling voltage $Vt\_fall^{1st}$ caused by a first touch input during a first time interval t1. The fingerprint sensor may sense a fourth falling voltage $Vf\_fall^{4th}$ caused by the first touch input during the first time interval t1. In this case, the electronic device may determine that the first touch input is applied to the fingerprint sensor (e.g. the first touch input is in the second area 502). The electronic device may then recognize the biometric pattern (e.g. fingerprint) of the external object (e.g. the user's finger) applying the first touch input, by using the fingerprint sensor.

For another example, the touch sensor may sense a second falling voltage $Vt\_fall^{2nd}$ caused by a second touch input during a second time interval t2. The fingerprint sensor may sense a fifth falling voltage $Vf\_fall^{5th}$ caused by the second touch input during the second time interval t2. In this case, the electronic device may determine that the second touch input is applied to the touch sensor (e.g. the second touch input is in the first area 501). The electronic device may then recognize the coordinates of the second touch input, by using the touch sensor.

According to an embodiment, if the voltage sensed in the area of the touch sensor adjacent to the fingerprint sensor is with a first range r1 and the voltage sensed in the area of the fingerprint sensor adjacent to the touch sensor is within a second range r2, the electronic device may determine that the input by the external object is sensed by both the touch sensor and the fingerprint sensor. For example, the touch sensor may sense a third falling voltage $Vt\_fall^{3rd}$ caused by a third touch input during a third time interval t3. The fingerprint sensor may sense a sixth falling voltage $Vf\_fall^{6th}$ caused by the third touch input during the third time interval t3. If the sixth falling voltage $Vf\_fall^{6th}$ is within the first range r1 and the third falling voltage $Vt\_fall^{3rd}$ is within the second range r2, the electronic device may determine that the input by the external object is sensed by both the touch sensor and the fingerprint sensor. In this case, the electronic device may calculate the coordinates of the third touch input based on at least part of the data sensed by the touch sensor and the fingerprint sensor. In detail, an exemplary method of calculating coordinates will be described below with reference to FIGS. 8 to 12.

Figure 8:
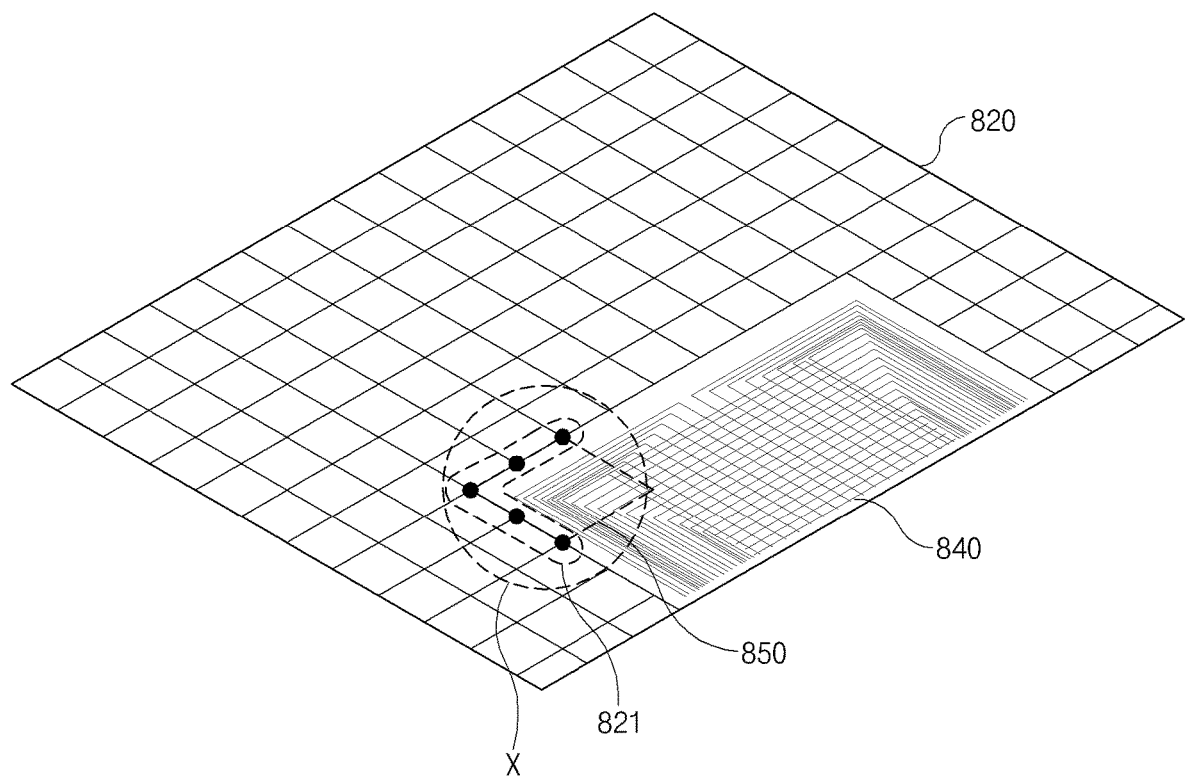
FIG. 8 is a view illustrating an exemplary embodiment in which an electronic device calculates coordinates, according to an embodiment.

FIG. 8 is a view illustrating an exemplary embodiment in which an electronic device calculates coordinates, according to an embodiment.

Referring to FIG. 8, the electronic device according to an embodiment may include a touch sensor 820 and a fingerprint sensor 840. The touch sensor 820 and the fingerprint sensor 840 in FIG. 8 may have the same configurations as the touch sensor 620 and the fingerprint sensor 640 in FIG. 6.

According to an embodiment, the electronic device (e.g., the processor 470, the touch IC 430, and/or the fingerprint IC 450) may calculate coordinates of an input by an external object, based on coordinates on the boundary of the touch sensor 820 where the input is sensed. For example, the touch sensor 820 and the fingerprint sensor 840 may both sense the input at an area X. The electronic device may obtain coordinates 821 on the boundary of the touch sensor 820, at each of which the input by the external object is sensed. For example, the coordinates 821 on the boundary of the touch sensor 820 may be inside the area X. The electronic device may then estimate a virtual rectangular area 850 based on the obtained coordinates 821. The coordinates of the center point of the virtual rectangular area 850 may be used as the coordinates of the input.

Figure 9:
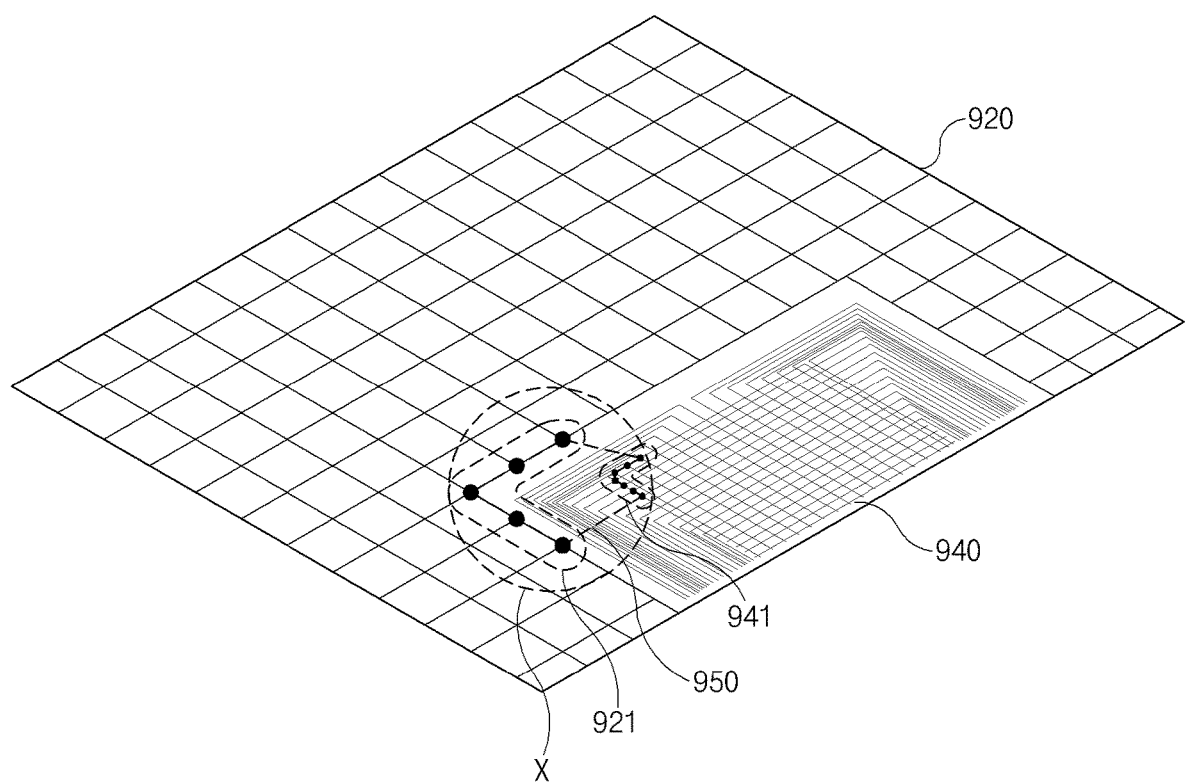
FIG. 9 is a view illustrating an exemplary embodiment in which an electronic device calculates coordinates, according to an embodiment.

FIG. 9 is a view illustrating an exemplary embodiment in which an electronic device calculates coordinates, according to an embodiment.

Referring to FIG. 9, the electronic device according to an embodiment may include a touch sensor 920 and a fingerprint sensor 940. The touch sensor 920 and the fingerprint sensor 940 in FIG. 9 may have the same configurations as the touch sensor 620 and the fingerprint sensor 640 in FIG. 6.

According to an embodiment, the electronic device (e.g., the processor 470, the touch IC 430, and/or the fingerprint IC 450) may calculate coordinates of an input by an external object, based on coordinates on the boundary of the touch sensor 920 and on the boundary of the fingerprint sensor 940 where the input is sensed. For example, the touch sensor 920 and the fingerprint sensor 940 may both sense the input to an area X. The electronic device may obtain coordinates 921 on the boundary of the touch sensor 920, at each of which the input by the external object is sensed. The electronic device may also obtain coordinates 941 on the boundary of the fingerprint sensor 940, at each of which the input by the external object is sensed. For example, the coordinates 921 on the boundary of the touch sensor 920 and the coordinates 941 on the boundary of the fingerprint sensor 940 may be inside the area X. The electronic device may then estimate a virtual polygonal area 950 based on the obtained coordinates 921 and 941. The coordinates of the center point of the virtual polygonal area 950 (e.g., the center of gravity or the circumcenter) may be used as the coordinates of the input.

Figure 10:
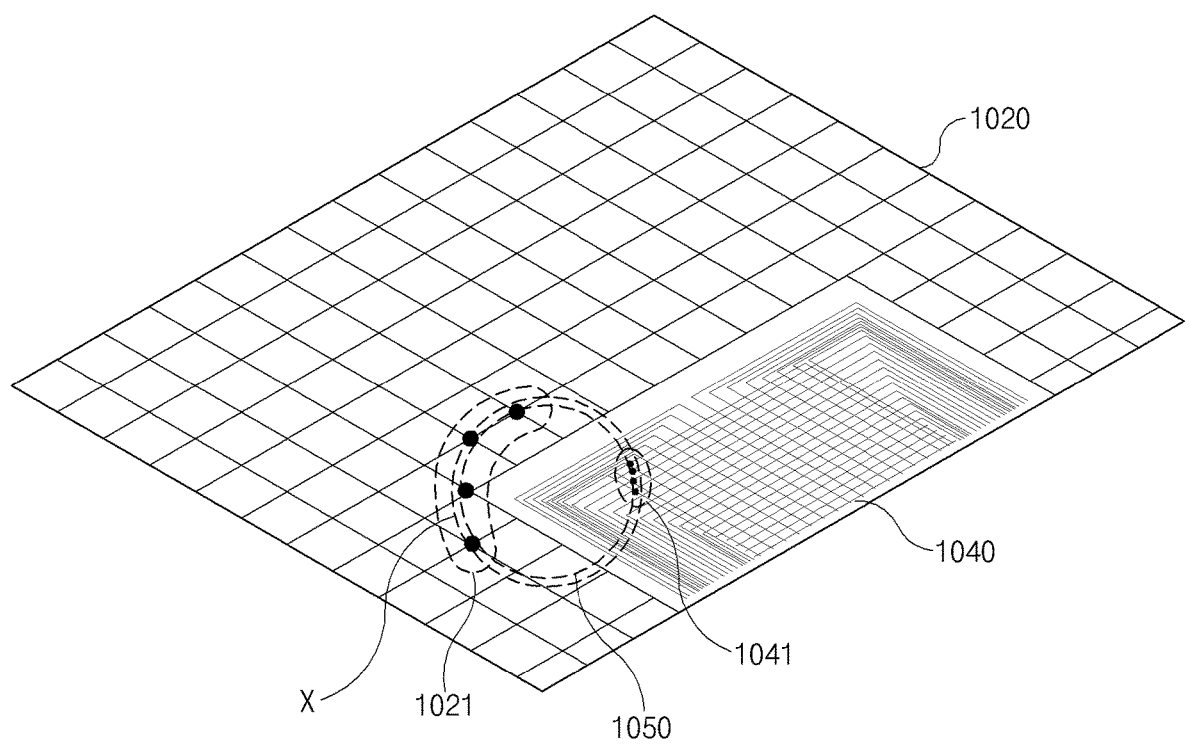
FIG. 10 is a view illustrating an exemplary embodiment in which an electronic device calculates coordinates, according to an embodiment.

FIG. 10 is a view illustrating an exemplary embodiment in which an electronic device calculates coordinates, according to an embodiment.

Referring to FIG. 10, the electronic device according to an embodiment may include a touch sensor 1020 and a fingerprint sensor 1040. The touch sensor 1020 and the fingerprint sensor 1040 in FIG. 10 may have the same configurations as the touch sensor 620 and the fingerprint sensor 640 in FIG. 6.

According to an embodiment, the electronic device (e.g., the processor 470, the touch IC 430, or the fingerprint IC 450) may calculate the coordinates of an input by an external object, based on coordinates on the edge of the area of the input sensed by the touch sensor 1020 and the fingerprint sensor 1040. For example, the touch sensor 1020 and the fingerprint sensor 1040 may both sense the input at an area X. The electronic device may obtain coordinates 1021 where the electrodes of the touch sensor 1020 intersect the edge of the sensed input. The electronic device may obtain coordinates 1041 where the electrodes of the fingerprint sensor 1040 intersect the edge of the sensed input. For example, the coordinates 1021 or 1041 may be on the edge of the area X. The electronic device may then estimate a virtual circular area 1050 (or an elliptical area) based on the obtained coordinates 1021 and 1041. The coordinates of the center point of the virtual circular area 1050 may be used as the coordinates of the input.

Figure 11:
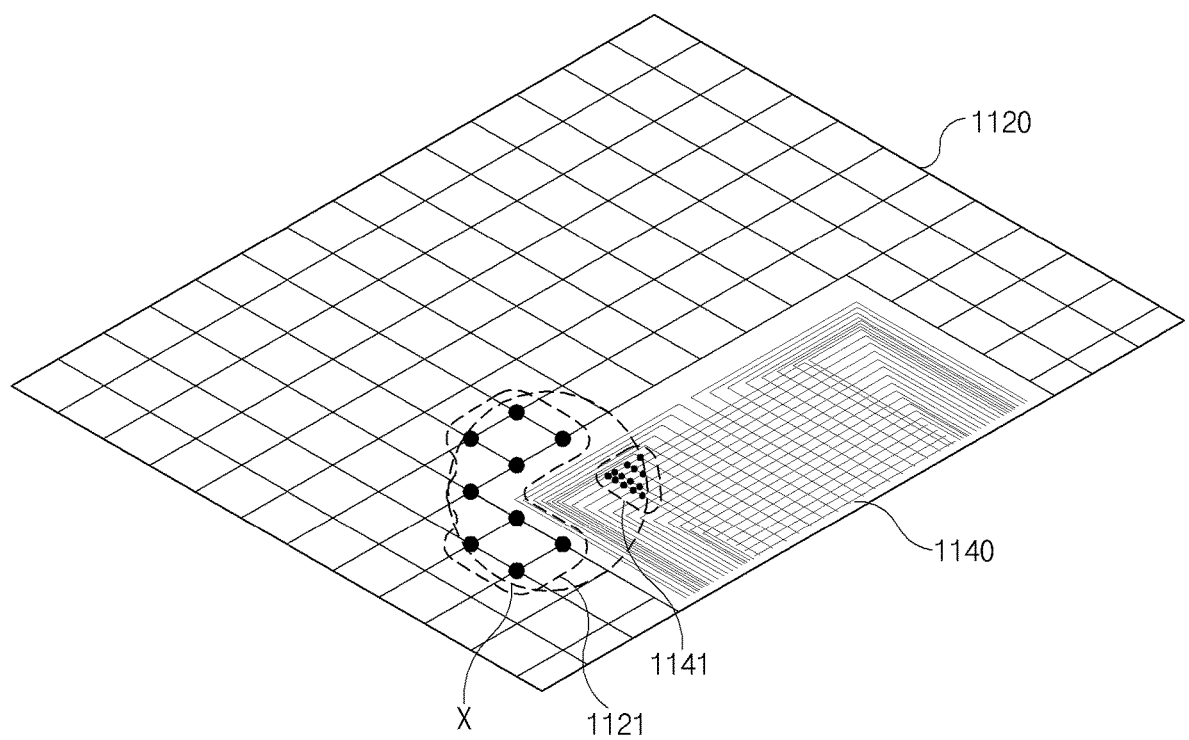
FIG. 11 is a view illustrating an exemplary embodiment in which an electronic device calculates coordinates, according to an embodiment.

FIG. 11 is a view illustrating an exemplary embodiment in which an electronic device calculates coordinates, according to an embodiment.

Referring to FIG. 11, the electronic device according to an embodiment may include a touch sensor 1120 and a fingerprint sensor 1140. The touch sensor 1120 and the fingerprint sensor 1140 in FIG. 11 may have the same configurations as the touch sensor 620 and the fingerprint sensor 640 in FIG. 6.

According to an embodiment, the electronic device (e.g., the processor 470) may calculate coordinates of an input by an external object by applying linear interpolation or weighted interpolation to all coordinates at each of which the input is sensed by the touch sensor 1120 and the fingerprint sensor 1140. For example, the touch sensor 1120 and the fingerprint sensor 1140 may both sense the input at an area X. The electronic device may obtain coordinates 1121 at each of which the input by the external object is sensed by the touch sensor 1120. The electronic device may obtain coordinates 1141 at each of which the input by the external object is sensed by the fingerprint sensor 1140. For example, the electronic device may obtain all the coordinates 1121 and 1141 inside the area X. The electronic device may apply the linear interpolation or the weighted interpolation to the obtained coordinates 1121 and 1141.

An exemplary equation for applying linear interpolation is as follows.

$$(x_t, y_t) = \Sigma(x,y)/N \quad \text{[Equation 1]}$$

Herein, $(x_t, y_t)$ denotes the coordinates of the input resulting from the linear interpolation, $(x, y)$ denotes each of the coordinates 1121 and 1141 obtained by the touch sensor 1120 and the fingerprint sensor 1140, and N denotes the number of coordinates 1121 and 1141 obtained by the touch sensor 1120 and the fingerprint sensor 1140.

An exemplary equation for applying weighted interpolation is as follows.

$$(x_t, y_t) = \{\alpha \Sigma(x,y)_{touch} + \beta \Sigma(x,y)_{fingerprint}\}/N \quad \text{[Equation 2]}$$

Herein, $\alpha$ denotes the weight of the coordinates 1121 obtained by touch sensor 1120, $(x, y)_{touch}$ denotes each of the coordinates 1121 obtained by the touch sensor 1120, $\beta$ denotes the weight of the coordinates 1141 obtained by the fingerprint sensor 1140, and $(x, y)_{fingerprint}$ denotes each of the coordinates 1141 obtained by the fingerprint sensor 1140.

Figure 12:
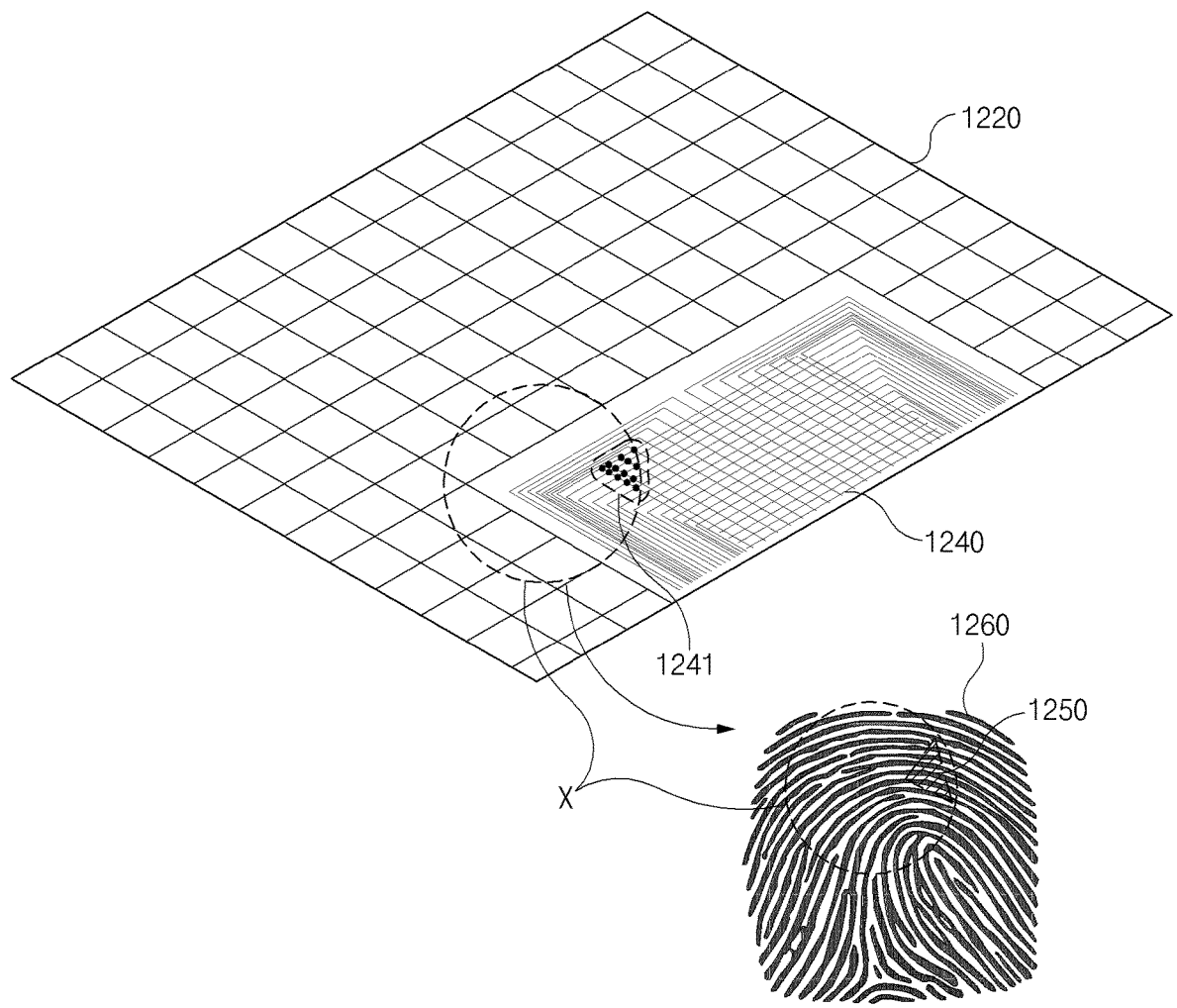
FIG. 12 is a view illustrating an exemplary embodiment in which an electronic device calculates coordinates, according to an embodiment.

FIG. 12 is a view illustrating an exemplary embodiment in which an electronic device calculates coordinates, according to an embodiment.

Referring to FIG. 12, the electronic device according to an embodiment may include a touch sensor 1220 and a fingerprint sensor 1240. The touch sensor 1220 and the fingerprint sensor 1240 in FIG. 12 may have the same configurations as the touch sensor 620 and the fingerprint sensor 640 in FIG. 6.

According to an embodiment, if a fingerprint is recognized by the fingerprint sensor 1240, the electronic device (e.g., the processor 470) may store an image corresponding to the fingerprint. For example, the electronic device may recognize the fingerprint by using the fingerprint sensor 1240. If the fingerprint is recognized by the fingerprint sensor 1240, the electronic device may store a fingerprint image 1260 corresponding to the fingerprint.

According to an embodiment, if an input by an external object is sensed by both the touch sensor 1220 and the fingerprint sensor 1240, the electronic device may estimate an area in which the external object is to be recognized by the touch sensor 1220 and the fingerprint sensor 1240, based on the fingerprint image and an image corresponding to the external object. For example, if the input to an area X is sensed by both the touch sensor 1220 and the fingerprint sensor 1240, the fingerprint sensor 1240 may obtain the coordinates 1241, at each of which the input is sensed. The electronic device may obtain an image 1250 of the external object sensed on the coordinates 1241, by using the fingerprint sensor 1240. The electronic device may match the image 1250 of the external object to the fingerprint image 1260. The electronic device may then determine that the area X is an area extending over the upper-left portion of the fingerprint sensor 1240, based on matching the image 1250 with the fingerprint image 1260. The electronic device may also estimate the area X based on the fingerprint image 1260 and the image 1250 of the external object.

According to above embodiments, the electronic device may calculate the coordinates corresponding to an input by an external object, based on an area in which the external object is to be recognized. For example, the electronic device may estimate an area X where the external object is sensed and may calculate the center point of the area X as the coordinates of the input.

Figure 13:
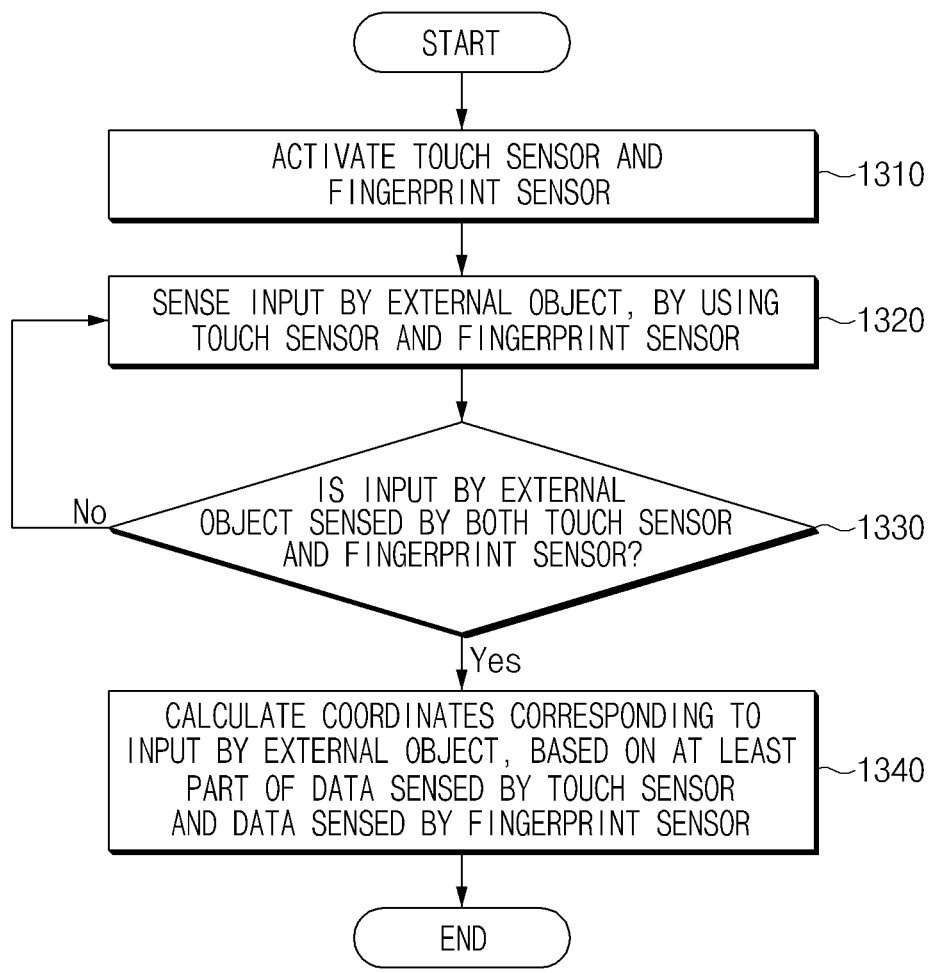
FIG. 13 is a flowchart illustrating a touch coordinate sensing method of an electronic device, according to an embodiment.

FIG. 13 is a flowchart illustrating a touch coordinate sensing method of an electronic device, according to an embodiment.

Hereinafter, it is assumed that the electronic device 400 of FIG. 4 performs a process of FIG. 13. For example, the processor 470 of the electronic device 400 may execute the operations of FIG. 13.

Referring to FIG. 13, in operation 1310, the electronic device (e.g., the processor 470) may activate a touch sensor and a fingerprint sensor. For example, if a display is activated, the electronic device may supply power to the touch sensor and the fingerprint sensor.

In operation 1320, the electronic device (e.g., the processor 470) may sense an input by an external object using the touch sensor and the fingerprint sensor. For example, the electronic device may sense the input by the external object by sensing changes in the voltages sensed in the touch sensor and the fingerprint sensor.

In operation 1330, the electronic device (e.g., the processor 470) may determine whether the input by the external object is sensed by both the touch sensor and the fingerprint sensor. For example, if the voltage sensed by the touch sensor is within a first range and the voltage sensed by the fingerprint sensor is within a second range, the electronic device may determine that the input by the external object is sensed by both the touch sensor and the fingerprint sensor.

If the input by the external object is sensed by the touch sensor and fingerprint sensor, in operation 1340, the electronic device (e.g., the processor 470) may calculate the coordinates of the input based on at least part of the data sensed by the touch sensor and the fingerprint sensor. For example, the electronic device may calculate the coordinates of the input using the method described with reference to FIGS. 8 to 12.

The term "module" used herein may include a unit, which is implemented with hardware, software, or firmware, and may be interchangeably used with the terms "logic," "logical block," "component," "circuit," or the like. The "module" may be an unit of an integrated component or a part thereof for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed. According to various embodiments, at least a part of an apparatus (e.g., modules or functions thereof) or a method (e.g., operations) may be, for example, implemented by instructions stored in a computer-readable storage media (e.g., the memory 130) in the form of a program module. The instruction, when executed by a processor (e.g., a processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter. According to various embodiments, a module or a program module may include at least one of the above elements, or a part of the above elements may be omitted, or other elements may be further included. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a touch sensor disposed in at least a partial area of the display;
   a fingerprint sensor disposed in at least part of the partial area of the display and including a sensing area for sensing biometric information and a wiring area in which a plurality of wirings connected to the sensing area are disposed; and
   a processor, wherein the processor is configured to:
      using the touch sensor and the fingerprint sensor, sense an input at least partially overlapping a partial area of the wiring area;
      in response to sensing the input, obtain first location information about the input using the touch sensor and obtain second location information about the input using the fingerprint sensor; and
      determine location information of the input corresponding to the partial area of the wiring area, based at least on the first location information and the second location information,
   wherein the processor is further configured to:
      estimate a virtual area based on coordinates obtained by the touch sensor and the fingerprint sensor on an area where the input by an external object is sensed; and
      calculate coordinates of the input as a center point of the virtual area.

2. The electronic device of claim 1, wherein the processor is configured to:
   determine the location information of the input based on coordinates on a boundary of the touch sensor where the input is sensed and coordinates on a boundary of the sensing area where the input is sensed.

3. The electronic device of claim 1, wherein the processor is configured to:
   determine the location information of the input based on coordinates on an edge of an area where the input is sensed.

4. The electronic device of claim 1, wherein the processor is configured to:
   determine the location information of the input by applying linear interpolation to the first location information and the second location information.

5. The electronic device of claim 1, wherein the processor is configured to:
   determine the location information of the input by applying weighted interpolation to the first location information and the second location information.

6. An electronic device comprising:
   a cover glass;
   a touch sensor disposed under the cover glass and configured to sense proximity of or contact by an external object;
   a touch integrated circuit (IC) electrically connected to the touch sensor;
   a fingerprint sensor disposed under the cover glass adjacent to the touch sensor, including an active area for sensing a biometric pattern of the external object and an inactive area surrounding a periphery of the active area;
   a fingerprint IC electrically connected to the fingerprint sensor; and
   a processor electrically connected to the touch IC and the fingerprint IC,
   wherein the processor is configured to:
      if an input by the external object is sensed by both the touch sensor and the fingerprint sensor, calculate coordinates of the input based on at least part of data sensed by the touch sensor and data sensed by the fingerprint sensor;
      estimate a virtual area based on coordinates obtained by the touch sensor and the fingerprint sensor on an area where the input by the external object is sensed; and
      calculate coordinates of the input as a center point of the virtual area.

7. The electronic device of claim 6, wherein the fingerprint sensor is a capacitive fingerprint sensor.

8. The electronic device of claim 6, wherein the fingerprint sensor includes lines electrically connected to the active area and arranged inside the inactive area, and a shield member disposed inside the inactive area to shield an electromagnetic wave emitted from the lines.

9. The electronic device of claim 6, wherein the fingerprint sensor is interposed between the cover glass and the touch sensor.

10. The electronic device of claim 6, wherein the fingerprint sensor overlaps the touch sensor in a top view of the cover glass, and the fingerprint sensor interferes with detection of the external object by the touch sensor in an area where the fingerprint sensor overlaps the touch sensor.

11. The electronic device of claim 6, wherein the fingerprint sensor and the touch sensor are disposed on a same plane.

12. The electronic device of claim 6, wherein the inactive area of the fingerprint sensor is laterally adjacent to the touch sensor.

13. The electronic device of claim 6, wherein the processor is configured to:
   if a first voltage sensed in a first area of the touch sensor adjacent to the fingerprint sensor is outside a first range and a second voltage sensed in a second area of the fingerprint sensor adjacent to the touch sensor is within a second range, use the fingerprint sensor to sense the biometric pattern of the external object;
   if the first voltage is within the first range and the second voltage is outside the second range, calculate the coordinates of the input based on the data sensed by the touch sensor; and
   if the first voltage is within the first range and the second voltage is within the second range, calculate the coordinates of the input based on the data sensed by the touch sensor and the data sensed by the fingerprint sensor.

14. The electronic device of claim 6, wherein the processor is configured to:
calculate the coordinates of the input based on coordinates on a boundary of the touch sensor where when the input is sensed.

15. The electronic device of claim 6, wherein the processor is configured to:
calculate the coordinates of the input based on first coordinates on a boundary of the touch sensor where the input is sensed and second coordinates on a boundary of the fingerprint sensor where the input is sensed.

16. The electronic device of claim 6, wherein the processor is configured to:
calculate the coordinates of the input based on coordinates on an edge of an area where the input is sensed.

17. The electronic device of claim 6, wherein the processor is configured to:
if a fingerprint is recognized by the fingerprint sensor, store an image corresponding to the fingerprint;
if the input by the external object is sensed by both the touch sensor and the fingerprint sensor, estimate an area in which the external object is to be recognized by the touch sensor and the fingerprint sensor, based on the image corresponding to the fingerprint and an image corresponding to the external object; and
calculate the coordinates of the input based on the area in which the external object is to be recognized.

18. The electronic device of claim 6, wherein the touch IC transmits first coordinates where the input is sensed by the touch sensor to the processor,
wherein the fingerprint IC transmits second coordinates where the input is sensed by the fingerprint sensor to the processor, and
wherein the processor is configured to:
calculate the coordinates of the input based on the first coordinates and the second coordinates.

19. The electronic device of claim 6, wherein the touch IC is electrically connected to the fingerprint IC,
wherein the touch IC or the fingerprint IC transmit, to the processor, at least a part of first coordinates where the input is sensed by the touch sensor and second coordinates where the input is sensed by the fingerprint sensor, and
wherein the processor is configured to:
calculate the coordinates of the input based on the at least part of the first coordinates and the second coordinates.

20. A touch coordinate sensing method of an electronic device, the method comprising:
activating a touch sensor and a fingerprint sensor included in the electronic device;
sensing an input by an external object, using the touch sensor and the fingerprint sensor;
if the input by the external object is sensed by both the touch sensor and the fingerprint sensor, calculating coordinates of the input based on at least part of data sensed by the touch sensor and data sensed by the fingerprint sensor;
estimating a virtual area based on coordinates obtained by the touch sensor and the fingerprint sensor on an area where the input by an external object is sensed; and
calculating coordinates of the input as a center point of the virtual area.

* * * * *